Feb. 24, 1931.   T. H. SIDDALL   1,794,038
GEARING
Filed Aug. 20, 1924
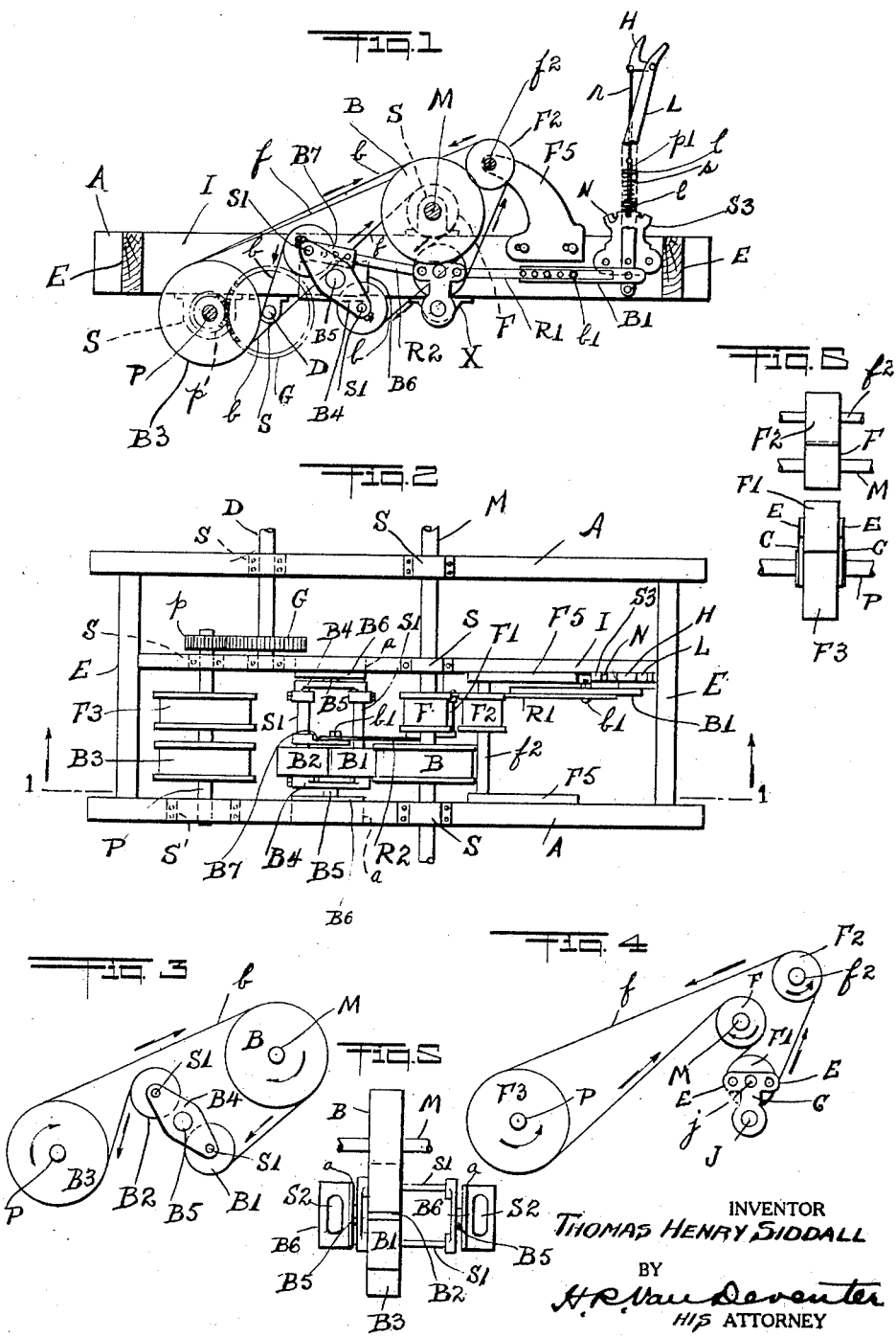

Patented Feb. 24, 1931

1,794,038

UNITED STATES PATENT OFFICE

THOMAS HENRY SIDDALL, OF SUMTER, SOUTH CAROLINA, ASSIGNOR TO SUMTER MACHINERY COMPANY, OF SUMTER, SOUTH CAROLINA, A CORPORATION OF SOUTH CAROLINA

GEARING

Application filed August 20, 1924. Serial No. 733,116.

My invention relates to improvements in gearing; especially gearing for the transmission of power, and adapted to enable a driveshaft to turn a driven shaft in opposite directions at the will of the operator.

An object of this invention is to provide gearing comprising a controlling member so mounted and connected that it can be easily and advantageously actuated, with a small degree of movement to enable the driven shaft to be rotated in either a forward or reverse direction.

The nature of the invention is set forth in the following description, and the characteristics defined in the appended claim; but I of course reserve the right to make changes that come within the scope and principle of my invention, as indicated by the broad meanings of the terms in which the appended claim are expressed.

On the drawings:

Figure 1 is a side view of gearing according to my invention; in section on line 1—1 of Figure 2;

Figure 2 is a top view of same;

Figures 3 and 4 are side views of the backing and forward connections, detached, of my improved gearing; and Figures 5 and 6 respectively are end views of what is illustrated in Figures 3 and 4.

The same numerals identify the same parts throughout.

The invention disclosed herein is similar to the construction shown in the specification of my United States Patent No. 1,160,537, granted November 16, 1915; and is designed chiefly for sawmill feed works, but is not limited to such uses, as it may be employed for mechanical power transmission of any kind.

In the drawings I show a supporting framework comprising longitudinal side beams A, joined by ends E. Between the beams A is an intermediate longitudinal beam I, and mounted in bearings S affixed to the frame is a transverse drive shaft M. On this shaft are secured a forward pulley F and a backing pulley B. The letter P represents the driven shaft, mounted in bearings S on the beam I and one of the beams A, and having fixed thereon pulleys F3 and B3 respectively cooperating with the pulleys F and B. On the shaft P is also fixed a gear $p$, meshing with a gear G on a shaft D, which is mounted in bearings S on the beam I and the other beam A. A belt $f$ runs over the pulleys F and F3, and another belt $b$ runs over the pulleys B and B3. Belt $b$ runs over the tops of the two pulleys B and B3, but the belt $f$ runs from the bottom of the pulley F3 to top of the pulley F; hence these belts will turn the shaft $p$ in opposite directions, according to which belt is caused to take effect on the two shafts M and P.

Associated with the pulley F is an idler pulley F2, mounted a little above the pulley F on a journal $f2$ in bearings F5 secured to the beams I and A, and below the pulley F is a tightening pulley F1 mounted on a journal $j$. This journal is secured to the ends of links C, between which the pulley F1 is received, and the links are pivotally mounted on a pin or journal J, affixed to an extension X on the lower side of the beam I. Belt $f$ runs from the top of pulley F2 to the top of pulley F3, then from the lower side of pulley F3 to the top of pulley F, and thence to pulley F2 around the pulley F1. To one of the links C is pinned at E a rod R1 joined by a bar B1 to a lever or controlling member L pivotally mounted on the beam I. Adjacent to this lever is a segment or plate S3 secured to the beam I, and having recesses N in its upper edge. The lever L carries a catch $p1$, sliding in perforated lugs $l$ on the lever, and pinned to a rod $r$, pivotally attached at its upper end to a small bell-crank H pivoted to the upper end of the lever L. A spring $s$ encircles the catch $p1$, and is made fast thereto at one end and to one of the lugs $l$, such as the lower lug, at the other, so as to tend to depress this catch. Hence the catch will engage the selected notch N, and hold the lever in adjusted position. By pressing the small bell-crank H toward the lever F, the catch can be disengaged from the segment S, so that the lever L can be moved to adjust the pulley F1 to tighten or loosen the belt $f$ as desired.

The rod R1 and bar B1 may have a number of holes, and be united by one or more pins or bolts b1 (with nuts) passing through these holes; see Figure 2; so that the connection of the rod and bar can be regulated. Between the backing pulleys B and B3, and engaging the lower side of the belt b are tightening pulleys B1 and B2. These pulleys are mounted to turn on journals S1, fixed in the ends of links B4, between which these pulleys are placed; and each link has a central journal B5, which enters a recess S2 of suitable shape in a mounting or angle plate B6. One of these plates is fastened to the inside and bottom of the beam A, shown at the bottom of Figure 2; and the other is fixed to the opposite face and bottom of the beam I. On the journal S1 shown at the top of Figure 1 is pivotally mounted a connecting box B7, joined by a rod or link R2 to one of the links C; the box B7 and rod or link R2 being adjustably connected to each other the same as the rod or link R1 and bar B1. Hence motion of the lever L will actuate not only the pulley F1 but also the pulleys B1 and B2.

As plainly appears from the drawings, the loosening of the forward belt f will tighten the belt b. Then the shaft M will turn the shafts P and D in the backward direction. Loosening the belt b will tighten the belt f, and enable the shaft M to rotate the shafts P and D in the forward direction. Either result is obtained by a small movement of the lever L and a straight movement of the bar B1, and the rods R1 and R2. The belt b runs from the lower side of the pulley B under the pulley B1, and then over the pulley B2 to the pulley B3 and thus the belt b, when reverse rotation of the shaft P is desired, is taken up and tightened by a straight pull at two points, making the control efficient and easy, and the same slight movement that tightens one belt instantly loosens and releases the other.

The two links B4 with the journals S1 carrying the pulleys B1 and B2 constitute a carrying member or frame for the tightening pulleys of the belt b, so that the pulleys B1 and B2 can be actuated as a single unit.

Pulleys B, B3, F, F3 and F2 are shown with flanges in Figure 1, but without flanges in the other views for the sake of clearness. Obviously flanges may be provided or omitted as desired. Also the belts do not appear in Figures 2, 5 and 6 to avoid concealing some of the parts.

Figures 5 and 6 show all the moving members or pulleys on Figures 3 and 4 as if seen from the right, with the belts omitted. The plates B6 are angle plates, and appear in Figure 5 as if detached and turned to present the portions having the recesses S2; the remaining portions a being seen edgewise. When these plates are mounted, the portions having the recesses fit against the beams A and I, and the portions a under the beams, as in Figure 2.

Having described my invention what I believe to be new and desire to secure and protect by Letters Patent of the United States is:—

The combination of a driving shaft, a driven shaft, a pulley on each of said shafts for actuating a belt in a forward direction, a pulley on each of said shafts for actuating a belt in a reverse direction, a belt connecting the forward pulleys, a belt connecting the backing pulleys, a pivoted member and a pair of idler pulleys to control the belt on the backing pulleys, said member lying transversely of said backing belt, an idler pulley associated with the forward pulley on the driving shaft, an adjustable pulley in position to engage the belt on the forward pulleys as it passes from the forward pulley on the drive shaft to the idler pulley, a link connecting said member and the adjustable pulley, a second link connected to said adjustable pulley, and a lever connected to said last named link, whereby movement of the lever will tighten either belt and loosen the other to enable the driving shaft to rotate the driven shaft in either forward or reverse direction.

In testimony whereof I affix my signature.

THOMAS HENRY SIDDALL.